: 2,793,161
Patented May 21, 1957

2,793,161

PROCESS FOR RECOVERING VITAMIN $B_{12}$

Fritz Lindner and Karl Kühn, Frankfurt am Main, Germany, assignors to Farbwerke Hoechst Aktiengesellschaft vormals Meister Lucius & Brüning, Frankfurt am Main Hochst, Germany, a company of Germany No Drawing. Application December 4, 1953,
Serial No. 396,340

Claims priority, application Germany December 10, 1952

3 Claims. (Cl. 167—81)

The present invention relates to a process for recovering vitamin $B_{12}$ from organ extracts or from a fermentation broth obtained by the propagation of a vitamin $B_{12}$ producing microorganism in a suitable nutrient medium. More particularly it relates to a process of obtaining vitamin $B_{12}$ by means of hydroxyl compounds of aromatic hydrocarbons possessing condensed benzene nuclei.

The main difficulty in producing vitamin $B_{12}$ from a natural starting material, for example the liver extracts or fermentation broths of microorganisms, consists in that the vitamin $B_{12}$ content of these initial broths is extraordinarily small. It is, therefore, necessary to find processes permitting the quickest possible recovery of the active substance in a good yield.

Up to now the initial broths have, for example, been concentrated and then extracted with an organic solvent.

Now we have found that vitamin $B_{12}$ can be obtained from organ extracts or fermentation broths of vitamin $B_{12}$ producing microorganisms by treatment with a hydroxyl compound of an aromatic hydrocarbon possessing condensed benzene nuclei, for example, a naphthol, a hydroxyanthracene or the like, preferably alpha-naphthol, said compound either being used as adsorbent in the form of a precipitate or dissolved in a suitable water-immiscible organic solvent in the form of a concentrated solution as an extracting agent for vitamin $B_{12}$. Suitable water-immiscible organic soluents are, for example, benzyl alcohol or aliphatic alcohols of medium chain length, such as octyl alcohol.

Vitamin $B_{12}$ can be extracted practically quantitatively from the fermentation broths by means of a small percentage of a highly concentrated solution of alpha-naphthol in benzy alcohol or octyl alcohol. By the addition of a salt decreasing the solubility of the organic solvent in the aqueous phase, the affinity of vitamin $B_{12}$ for the organic phase is further improved and a smaller amount of solvent is thus required.

If said hydroxyl compound of an aromatic hydrocarbon possessing condensed benzene nuclei is used as an adsorbent advantageously a precipitate of the adsorbent is produced in the broth to be treated. To this end an alkaline solution of the hydroxyl compound concerned is run, while stirring, into the acidified broth containing vitamin $B_{12}$. There may, however, just as well be used a solution in a suitable organic solvent miscible with water. By precipitating the adsorbent in the broth in a finely divided state, a particularly good adsorptive effect is produced.

As experiments have shown, the adsorption is advantageously carried out in an acid medium, for example at a pH value of 1–3. Improved adsorption can be attained by dissolving a salt, for example sodium chloride, sodium sulfate or the like, in the broth to be treated. The working up of the adsorbates which have been separated is especially simple since it is only necessary to dissolve the adsorbate with a suitable organic solvent; the vitamin $B_{12}$ is obtained as residue.

The further purification and working up of the products, for example to crystalline vitamin $B_{12}$, may be carried out by known methods and are relatively simple to accomplish since according to the process of the invention a crude product is obtained which already contains about 1 percent of vitamin $B_{12}$.

The following examples serve to illustrate the invention but they are not intended to limit it thereto:

Example 1

17 grams of alpha-naphthol purified by distillation are dissolved in 16.4 cc. of 10 N sodium hydroxide solution and 55 cc. of water; the total volume amounts to 85 cc.

For neutralizing 1 cc. of the alkaline solution of alpha-naphthol, 0.061 cc. of concentrated sulfuric acid is required.

8 cc. of concentrated sulfuric acid are added, while vigorously stirring, to 1 liter of a fermentation broth treated with potassium cyanide and freed from the mycelium, and the resulting turbidity and flocculation are eliminated by filtering with suction by means of a clearing layer. Measured with a glass electrode, the pH value of the purified broth amounts to 1.8. 2.3 cc. of concentrated sulfuric acid are added to the clear broth and 37.5 cc. of the alkaline solution of alpha-naphthol are poured in, while stirring. A white milky precipitate is formed which after a short time assumes a brownish yellow color while becoming more coarsely granular. After stirring for 5 minutes, the precipitate is filtered off with suction and another precipitation is carried out in the filtrate in the manner described above. The mother liquid obtained after the second precipitation is still somewhat turbid and is purified by means of a clearing layer. The precipitates obtained are thoroughly filtered off with suction and squeezed, then combined and washed twice with 20 cc. each of water.

The clearing layer containing small quantities of alpha-naphthol is washed with 15 cc. of water and filtered with suction. 150 cc. of ether are then forced through by suction. The ether of the clearing layer is added to the combined precipitates in a separating funnel and the whole is shaken out with 50 cc. of water which has been passed through the clearing layer after the latter had been washed with ether. The emulsion is refracted by centrifuging and the layers are separated. The aqueous phase is shaken out twice with 15 cc. each of ether, the two ethereal phases are added to the bulk of ether, the resulting ethereal phase is shaken out twice with 15 cc. each of water and the aqueous phases are combined. The aqueous final phase is obtained in a total volume of 75 cc.

Vitamin $B_{12}$ content of (a) the initial broth: 2.2 micrograms/cc.=2.2 milligrams of the total amount of vitamin $B_{12}$; (b) the filtrate after the second precipitation: 0.580 microgram/cc.=0.58 milligram of vitamin $B_{12}$; (c) the aqueous final phase: 21.8 micrograms/cc.=1.63 milligrams of vitamin $B_{12}$.

Dry weights (drying for 1 hour at 110° C.) of vitamin $B_{12}$ in (a) the fermentation broth: 30.1 milligrams/cc., corresponding to a dry bulk of 30.1 grams; (b) the aqueous final phase: 2.32 milligrams/cc., corresponding to 0.175 gram of dry bulk.

Vitamin $B_{12}$ content of the initial broth: 1:13,650; vitamin $B_{12}$ content of the final solution: 1:108.

Example 2

150 grams of anhydrous sodium sulfate are added to 1 liter of a fermentation broth which has been treated with potassium cyanide and freed from the mycelium, and the sulfate is dissolved by stirring. When dissolution is complete, 8 cc. of concentrated sulfuric acid are introduced. The broth is centrifuged, 4.4 cc. of concentrated sulfuric acid are added to the clear broth and 75 cc. of the alkaline solution of alpha-naphthol are then poured in, while stirring.

After stirring for 5 minutes the precipitate is filtered off with suction, washed twice with 15 cc. each of water, filtered off with suction, removed from the filter and introduced, while stirring, into 150 cc. of acetone, containing 1.5 grams of auxiliary filter mass. The precipitate is filtered off with suction, washed twice with 15 cc. each of acetone, the precipitate is eluted four times with 20 cc. of water each, and the eluates are then combined. The aqueous final phase is obtained in a total volume of 75 cc.

Vitamin $B_{12}$ content of (a) the initial broth: 1.32 micrograms/cc.=1.32 milligrams of vitamin $B_{12}$; (b) the filtrate of the precipitate: 0.069 microgram/cc.=0.069 milligram of vitamin $B_{12}$; (c) the aqueous final phase: 16 micrograms/cc.=1.2 milligrams of vitamin $B_{12}$.

Dry weights of vitamin $B_{12}$ in (a) the initial broth: 31 milligrams/cc., corresponding to a dry bulk of 31 grams; (b) the aqueous final phase: 2.5 milligrams/cc., corresponding to a dry bulk of 0.187 gram.

Vitamin $B_{12}$ content of the initial broth: 1:23,500; vitamin $B_{12}$ content of the final solution: 1:155.

Example 3

60 grams of sodium chloride are dissolved in 200 cc. of a fermentation broth of *Streptomyces olivaceus* which has been treated with potassium cyanide and freed from the mycelium. The aqueous phase containing sodium chloride is extracted first with a solution of 2 grams of alpha-naphthol in 4 cc. of benzyl alcohol and subsequently with a solution of 2 grams of alpha-naphthol in 2 cc. of benzyl alcohol. The phases are separated by centrifuging. The organic phases which have separated are then combined and poured into 120 cc. of acetone containing a small amount of kieselguhr. The residue is washed twice with a small amount of acetone and extracted with water. The total volume of the aqueous phase amounts to 10.3 cc.

Vitamin $B_{12}$ content of (a) the initial broth: 2.5 micrograms/cc.=0.5 milligram; (b) the extracted solution: <0.15 microgram/cc.; (c) the aqueous final phase: 45 micrograms/cc.=0.464 milligram.

Dry weight of vitamin $B_{12}$ in (a) the initial broth: 26 milligrams/cc.=5.2 grams; (b) the aqueous final phase: 16 milligrams/cc.=0.16 gram.

Vitamin $B_{12}$ content of the initial broth: 1:5600; vitamin $B_{12}$ content of the final solution: 1:350.

Example 4

10 cc. of the fermentation broth described in Example 3 are extracted with a solution of 0.2 gram of alpha-naphthol in 0.4 cc. of benzyl alcohol. The phases are separated, and the aqueous phase is then extracted once more with a solution of 0.2 gram of alpha-naphthol in 0.2 cc. of benzyl alcohol.

Vitamin $B_{12}$ content in (a) the initial broth: 2.5 micrograms/cc.; (b) the extracted solution: 0.132 microgram/cc.

We claim:

1. A process for recovering vitamin $B_{12}$ from vitamin $B_{12}$ containing organ extracts and fermentation broths obtained by the propagation of a vitamin $B_{12}$ producing microorganism in a suitable nutrient medium, comprising contacting an acidified vitamin $B_{12}$ containing aqueous solution with an alkaline aqueous solution of alpha-naphthol to thereby precipitate said alpha-naphthol in said aqueous solution with said vitamin $B_{12}$ adsorbed thereon, and thereafter recovering said vitamin $B_{12}$ from said adsorbent.

2. A process for recovering vitamin $B_{12}$ from vitamin $B_{12}$ containing organ extracts and fermentation broths obtained by the propagation of a vitamin $B_{12}$ producing microorganism in a suitable nutrient medium, comprising contacting at a pH of 1 to 3 a vitamin $B_{12}$ containing aqueous solution with an alkaline aqueous solution of alpha-naphthol to thereby precipitate said alpha-naphthol in said aqueous solution with said vitamin $B_{12}$ adsorbed thereon, and thereafter recovering said vitamin $B_{12}$ from said adsorbent.

3. The process defined in claim 2, wherein the contacting of said vitamin $B_{12}$ aqueous solution and said aqueous alpha-naphthol solution is effected in the presence of sodium sulfate.

References Cited in the file of this patent

UNITED STATES PATENTS

| | | |
|---|---|---|
| 2,134,256 | Laland | Oct. 25, 1938 |
| 2,643,968 | McCormack | June 30, 1953 |

OTHER REFERENCES

Smith: Nature, vol. 162, July 24, 1948, pages 144, 145.